United States Patent
Nishizawa

Patent Number: 5,865,515
Date of Patent: Feb. 2, 1999

[54] VIBRATION DAMPING DEVICE

[75] Inventor: Yukio Nishizawa, Itami, Japan

[73] Assignee: Sumitomo Electric Industries, Ltd., Osaka, Japan

[21] Appl. No.: 845,413

[22] Filed: Apr. 25, 1997

[51] Int. Cl.⁶ .................................................. F16D 65/38
[52] U.S. Cl. .................... 303/194; 188/73.37; 188/73.36
[58] Field of Search ................................ 303/194, 113.4, 303/196; 188/73.35, 73.36, 73.37, 250 E

[56] References Cited

U.S. PATENT DOCUMENTS

| | | | |
|---|---|---|---|
| 5,660,251 | 8/1997 | Nishizawa et al. | 188/73.35 |
| 5,687,818 | 11/1997 | Nishizawa et al. | 188/73.35 |

FOREIGN PATENT DOCUMENTS

| | | |
|---|---|---|
| 0 744 558 A | 11/1996 | European Pat. Off. . |
| 4-54324 | 2/1992 | Japan . |
| 4-54325 | 2/1992 | Japan . |

OTHER PUBLICATIONS

English Language Abstract of Japanese Patent application No. 02164857, entitled "Brake for Vehicle", Nagashima Taku et al., published Jun. 22, 1990.

English Language Abstract of Japanese Patent application No. 02164858, entitled "Brake for Vehicle", Nagashima Taku et al., published Jun. 22, 1990.

*Primary Examiner*—Lee W. Young
*Attorney, Agent, or Firm*—Wenderoth, Lind & Ponack, L.L.P.

[57] ABSTRACT

A vibration damper can suppress squeals of a brake in a positive and reliable manner while consuming less electric power. The damper has a vibration detector for detecting vibrations of the brake, and a vibrator for applying vibrations to the brake pad based on a detection signal from the vibration detector. An actuator circuit for actuating the vibration detector and vibrator is connected to a car battery through a changeover switch and another switch. These switches are closed only if a brake switch is detecting that the brake is being applied and a vehicle stop detector is detecting that the vehicle is not moving. When the switches are closed, electricity is supplied to the actuator circuit, so that the vibration detector and vibrator are actuated by the actuator circuit. With this arrangement, the damper is kept deactivated when it is unnecessary or detrimental to apply vibrations to the brake. Since it is activated only when necessary, it consumes less electric power.

1 Claim, 2 Drawing Sheets

VIBRATION DAMPING DEVICE

BACKGROUND OF THE INVENTION

This invention relates to a vibration damping device for suppressing vibrations of a brake in a positive manner in order to prevent squeals of the brake.

Means for suppressing squeals of a disc brake in a positive manner are disclosed e.g. in unexamined Japanese patent publications 4-54324 and 4-54325. A first piezoelectric element detects vibrations of the brake pads, and a second piezoelectric element applies vibrations to the pads based on the detection signals from the first piezoelectric element to damp the vibrations of the brake. The former publication '324 also discloses a vibration damper in which a vibrator applies inaudible vibrations to the friction members when the actuation of the brake switch is detected.

Such a conventional vibration damper of the type that detects brake vibrations through the pads and applies vibrations to the pads based on the vibration detection signal may be activated even while the brake is not applied if the pads vibrate due to whirling of the rotor. This occurs because the vibration damper mistakes the whirling of the rotor for brake vibrations. A vibration damper for a disc brake is designed to damp brake vibrations that can cause squeals of the brake. If, however, the vibration damper is activated due to vibrations of the kind that will not cause squeals of the brake (such as vibration induced by whirling of the rotor), it can increase, rather than decrease, vibrations that produce offensive noise. Such a damper practically does more harm than good.

Another type of conventional vibration damper is designed such that its circuit is activated only when the brake switch is on, so as to apply vibrations having a frequency out of the inaudible range to the pads. This damper has a problem in that it can be activated when not necessary, i.e. when the brake cannot squeal, such as when the driver is depressing the brake pedal with the vehicle at a stop.

A large amount of electric energy is needed to vibrate something at a high frequency. Thus, from an economical viewpoint, it is not desirable to vibrate the pads at a high inaudible frequency range as in the abovementioned prior art. Moreover, this conventional damper vibrates the pads when the brake switch is on, even if there is no necessity to apply vibrations to the pads, thus causing abnormal brake vibrations and offensive noise.

An object of this invention is to provide a solution to these problems.

SUMMARY OF THE INVENTION

According to the present invention, there is provided a vibration damper for damping vibrations of a brake, comprising a vibration detecting means for detecting vibrations of the brake. A vibrator means applies vibrations to the brake based on a detection signal from the vibration detecting means, a brake operation detecting means detects whether or not the brake is being applied, and a vehicle stop detecting means detects whether or not the vehicle is at a stop. An actuator circuit actuates the vibration detecting means and the vibrator means only if both of the following two conditions are met: 1) the brake operation detecting means is detecting that the brake is being applied, and 2) the vehicle stop detecting means is detecting that the vehicle is not at a stop.

The brake operation detector for detecting whether or not the brake is being applied may be a brake switch that detects whether or not the brake pedal is depressed, or a pressure sensor which detects the brake fluid pressure in the brake piping.

The vehicle stop detector may be wheel speed sensors or ground speed sensors used for wheel behavior control (such as antilock or anti-slip control). The signal from a speedometer may also be used.

Since the damper is kept deactivated while the brake is not applied, it cannot mistake vibrations other than vibrations due to braking, such as vibrations of the rotor while the brake is not being applied, for vibrations due to braking. Thus it will not unnecessarily apply vibrations to the brake.

Since the damper is kept deactivated while the vehicle is at a stop, it consumes less power.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
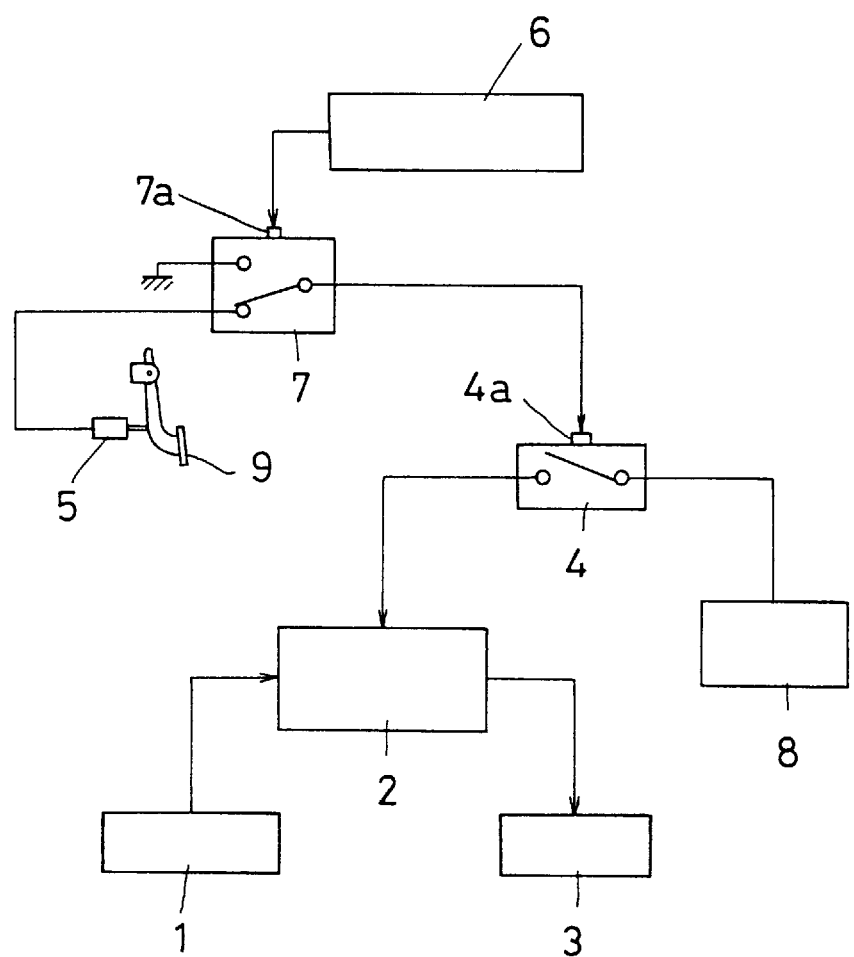
FIG. 1 is a block diagram of an embodiment of a vibration damper according to this invention.
Figure 2:
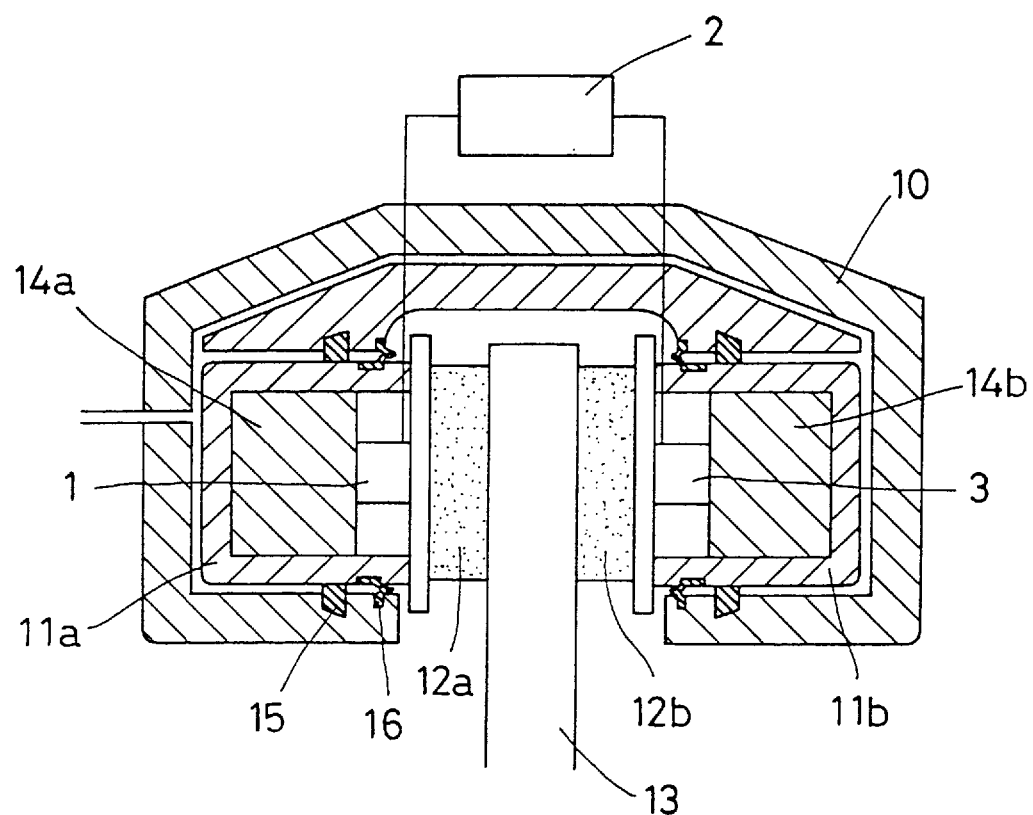
FIG. 2 is a sectional view of a specific example of a vibration detector/vibrator arrangement.

The attached figures show an embodiment of a vibration damper for use with a brake according to this invention. FIG. 1 is a block diagram of the entire device. FIG. 2 is a sectional view of an example of an arrangement in which the vibration detector means and the vibrator means are mounted in pistons of a disc brake, the pistons being arranged opposite to each other.

As shown in FIG. 1, the vibration damper comprises a vibration detector means 1, a control circuit 2, a vibrator means 3, a switch 4 for activating the control circuit 2, a brake switch 5, a detector means 6 for detecting that the vehicle is at a stop, and a changeover switch 7.

The switch 4 turns on and off the supply of power to the control circuit 2 from an on-board battery 8.

The changeover switch 7 is closed when the brake pedal 9 is depressed and the brake switch 5 is actuated. Simultaneously the switch 4 is actuated, too. In this embodiment, the brake switch used is of such a type that when the brake pedal is depressed, the brake switch 5 is closed, thus outputting a battery voltage (12 V). Otherwise, the output of the switch 5 is zero volt. The switches 4 and 7 have control terminals 4a and 7a, respectively, and are closed when a voltage of 12 V is applied to the respective terminals.

When the brake switch 5 detects the operation of brake while the vehicle is moving, a voltage of 12 V is supplied to the switch 7, thus closing the switch 7 and thus the switch 4. Power is now supplied from the battery 8 to the control circuit 2, thereby activating the circuit 2. The vibration detector means 1 thus begins detecting brake vibrations. Based on the detection signal from the detector means 1, the vibrator means 3 applies vibrations to the pads.

As the detector means 6, a speedometer may be used to determine whether the vehicle is moving or not. When the detector means 6 determines that the vehicle is not moving, i.e. at a stop, it outputs a voltage of 12 V to the switch 7. Otherwise, the detector means 6 outputs no voltage. When a voltage of 12 V is applied to the control terminal 7a, the switch 7 is opened, and so is the switch 5. The control circuit 2 is now disconnected from the battery 8. Thus, as the vehicle is not moving, the vibration damper is kept deactivated even if the brake is applied.

By example, how vibration damping control is carried out is now described with reference to FIG. 2. The vibration damping mechanism shown in FIG. 2 is disclosed in Unexamined Japanese patent publication 8-320038, which was filed by the applicant of the present invention.

Shown in the figure are a caliper 10, opposed pistons 11a, 11b, pads 12a, 12b adapted to be pressed by the pistons into frictional contact with a rotor 13, presser means 14a, 14b mounted in the pistons 11a, 11b, piston seals 15 having functioning as piston retractors, and piston boots 16 sealing the openings of the cylinders.

The vibration detector means 1 used is a piezoelectric element pressed against the back of the pad 12a by the presser means 14a. The detector means detects vibrations of the rotor 13 through the pad 12a. The vibrator means 3 is also a piezoelectric element. It is pressed against the back of the pad 12b by the presser 14b to apply counteracting vibrations to the rotor 13 through the pad 12b to stop the vibration of the rotor 13.

The control circuit 2 receives the vibration detection signal from the vibration detector means 1, creates a signal for reducing to zero the detection signal by adjusting the gain and phase of the detection signal, and applies the thus created signal to the vibrator means 3.

Since the vibration of the rotor is detected through one of the two pads and the rotor is vibrated through the other pad, the vibration detector will not detect the vibrations of the pad applied by the vibrator means. This makes it possible to damp the vibration of the rotor in an ideal manner.

The present invention is equally applicable to a vibration damper of the type in which the detection of vibration and the application of vibration are carried out through the same pad, one of the type in which the vibration detector and vibrator are not piezoelectric elements, and one of the type in which the detector and vibrator are pressed against the pads in a manner different from the illustrated manner. Also, the present invention is applicable to a floating caliper type disc brake and a drum brake.

As described above, according to the present invention, the vibration damper will not mistake brake vibrations other than vibrations due to braking for vibrations due to braking.

Since the damper is kept deactivated while the vehicle is at a stop, it consumes less power and is thus economical. Still, its reliablity is high.

What is claimed is:

1. A vibration damper for damping vibrations of a brake, comprising a vibration detecting means for detecting vibrations of the brake, a vibrator means for applying vibrations to the brake based on a detection signal from said vibration detecting means, brake operation detecting means for detecting whether or not the brake is being applied, vehicle stop detecting means for detecting whether or not the vehicle is at a stop, and an actuator circuit for actuating said vibration detecting means and said vibrator means only if both of the following two conditions are met: 1) said brake operation detecting means is detecting that the brake is being applied, and 2) said vehicle stop detecting means is detecting that the vehicle is not at a stop.

* * * * *